Patented Jan. 12, 1943

2,307,982

UNITED STATES PATENT OFFICE 2,307,982

XANTHONE MANUFACTURE

Paul W. Bachman, Summit, N. J., and Berndt W. Hammarén, Floral Park, N. Y., assignors to General Chemical Company, New York, N. Y., a corporation of New York No Drawing. Application June 29, 1940, Serial No. 343,154

7 Claims. (Cl. 260—335)

This invention relates to the manufacture of xanthone and is particularly concerned with a process for effecting ring closure of phenoxy-benzoic acid or hydrolysis and ring closure of its phenyl ester.

In the past it has been proposed to produce xanthone by reaction of phenoxy-benzoic acid with ten times its weight of concentrated sulfuric acid. We have found, however, that while the process of the prior art may be employed for the production of small quantities of xanthone, such as normally produced in the laboratory, the use of this process on a large scale results in ineffective control and consequent reduction in yield, apparently because of sulfonation. Moreover the large quantities of sulfuric acid required are reflected in an excessive cost for this reagent and increase the size of equipment and the heat and power necessary for carrying out the process, and the product may be obtained in the form of a very persistent dispersion, which does not lend itself readily to conventional methods of separation, e. g. filtration.

The present invention has for an object improvement in the control of the ring closure reaction to produce xanthone whereby high yields of xanthone may consistently be obtained without rigid control of reaction conditions.

The invention has as a further object the production of xanthone in a form such that, upon dilution with water, it may be filtered from the reaction mass by conventional filtration procedures without the filtration difficulties attendant upon filtration of mixtures of xanthone and by-products resulting from ineffective control of the reaction.

A yet further object of the invention is reduction in the size and cost of equipment and reduction in heat, power, and material requirements.

In accordance with the present invention phenoxy-benzoic acid or its phenyl ester is mixed n concentrated sulfuric acid in a weight ratio of between 0.3 and 4.0 parts of $H_2SO_4$ for each 1 part of phenoxy-benzoic acid or ester, and the mixture is maintained at a temperature between 135° C. and 200° C. for a sufficient period to effect the ring closure and formation of xanthone. This period varies with the temperature, being shorter for the higher temperatures and longer for the lower temperatures.

It is preferred to mix the organic compound in molten form and 85% to 100% $H_2SO_4$, both at a temperature not above 120° C., in a weight ratio of $H_2SO_4$ to organic compound between 0.7 and 2.0 and to effect the reaction at a temperature between about 150° or 160° and 180° C. at which temperatures the reaction period necessary for complete ring closure varies from about 3 hours to about ¼ hour or less. The reaction may be conducted at ordinary atmospheric pressure or at higher or lower pressures. While a sulfuric acid having initially a concentration between 85% and 100% $H_2SO_4$ has been found to be satisfactory, the lower limit of acid concentration for atmospheric pressure operations is determined to some extent by the boiling point of the mixture. The sulfuric acid may be added to the organic compound or vice versa. Although effective agitation during the addition is not essential, it is desirable in that it aids in distributing the heat evolved during mixing and permits more rapid addition so that the temperature of the reaction mixture at the end of the addition may be practically that to be maintained during the reaction.

The xanthone, which is relatively insoluble in water or dilute sulfuric acid, may be precipitated from solution by diluting the reaction product with sufficient water to reduce the $H_2SO_4$ concentration to about 15% to 20% or by neutralizing the free acid with alkali or alkaline solution. Well-formed, easily filterable crystals are obtained merely by pouring the hot reaction product into 3 to 8 times its weight of water initially at room temperature. The resulting mixture may be cooled prior to filtration or filtered while yet hot.

The process of the invention is applicable to crude or refined acid or ester, especially to the crude acid containing on the order of 5% to 15% xanthone.

The following examples conducted at atmospheric pressure illustrate the process of my invention.

Example 1

400 pounds of molten o-phenoxy-benzoic acid at a temperature of about 110° to 120° C. are charged to a jacketed enamel-lined kettle. 380 pounds of 93% sulfuric acid at room temperature are then added rapidly to the well agitated o-phenoxy-benzoic acid. The addition of the sulfuric acid may be regulated to advantage so as to raise the temperature of the mixture to about 145° C. at the end of the sulfuric acid addition. After the sulfuric acid has been added and thoroughly mixed with the o-phenoxy-benzoic acid, the temperature is raised to about 165° C. and this temperature is maintained for about 1½ hours. The hot liquid product is cooled to about 110° C. and poured into 4 to 5 times its weight of cold water; xanthone crystallizes out from the solution in well-formed easily filterable crystals. The xanthone product, obtained in about 94% of theoretical yield, may be separated by filtration and washed with water or alkaline solution and water to remove residual sulfuric acid.

*Example 2*

400 pounds of molten o-phenoxy-phenyl-benzoate at about 115° C. are charged to a suitable reaction vessel and 440 pounds of 93% sulfuric acid at room temperature are added so as to raise the temperature of the mixture to about 150° C. at the end of the addition. The mixture is further heated to about 170° C. and held at this temperature for about ½ hour. The hot liquid product is then poured into cold water and xanthone is recovered as in the preceding example.

It will be noted that in the above examples a substantially larger proportion of sulfuric acid is employed for treatment of the ester than for treatment of the acid. This is usually preferred because some of the sulfuric acid is used up in a side reaction of by-product phenol liberated by hydrolysis of the ester, whereas in starting with the acid this side reaction is not involved. Also the by-product phenol and phenol sulfonic acid serve as diluents whereas the water formed from the free acid leaves the system and exerts no substantial diluent effect.

We claim:

1. The method of making xanthone from a compound of the group consisting of phenoxybenzoic acid and its phenyl ester, which comprises mixing said compound with concentrated sulfuric acid in a weight ratio of $H_2SO_4$ to said compound between 0.3 and 4.0, the temperature of said compound and said sulfuric acid prior to mixing being such that upon completion of the mixing the mixture is substantially at a reaction temperature between 150° and 180° C., and maintaining the temperature of the mixture between 150° and 180° C. until conversion of said compound to xanthone is substantially complete.

2. The method of making xanthone, which comprises reacting a compound of the group consisting of o-phenoxy-benzoic acid and its phenyl ester with concentrated sulfuric acid in a weight ratio of $H_2SO_4$ to said compound between 0.7 and 2.0 at a temperature between 150° and 180° C., diluting the reaction product with water, and mechanically separating the resulting xanthone crystals.

3. The method of making xanthone, which comprises adding concentrated sulfuric acid to a body of molten o-phenoxy-benzoic acid initially at a temperature below 120° C. in a ratio of $H_2SO_4$ to phenoxy-benzoic acid between 0.7 and 2.0, raising the temperature of the mixture to between 150° and 180° C. and maintaining it within this temperature range for between ¼ and 3 hours, diluting the reaction product with water to crystallize xanthone, and mechanically separating the xanthone crystals from solution.

4. The method of making xanthone, which comprises adding concentrated sulfuric acid to a body of molten o-phenoxy-phenyl-benzoate initially at a temperature below 120° C. in a ratio of $H_2SO_4$ to o-phenoxy-phenyl-benzoate between 0.7 and 2.0, raising the temperature of the mixture to between 160° and 150° C. and maintaining it within this temperature range for between ¼ and 3 hours, diluting the reaction product with water to crystallize xanthone, and mechanically separating the xanthone crystals from solution.

5. The method of making xanthone from a compound of the group consisting of phenoxybenzoic acid and its phenyl ester, which comprises reacting said compound with concentrated sulfuric acid in a weight ratio of $H_2SO_4$ to said compound between 0.3 and 4.0 at a temperature between 135° C. and 200° C.

6. The method of making xanthone from a compound of the group consisting of phenoxybenzoic acid and its phenyl ester, which comprises reacting said compound with concentrated sulfuric acid in a weight ratio of $H_2SO_4$ to said compound between 0.3 and 4.0 at a temperature between 135° and 200° C., diluting the reaction product with water, and mechanically separating the resulting xanthone crystals.

7. The method of making xanthone from a compound of the group consisting of phenoxybenzoic acid and its phenyl ester, which comprises reacting said compound with concentrated sulfuric acid in a weight ratio of $H_2SO_4$ to said compound between 0.3 and 4.0 at a temperature between 135° and 200° C., reducing the acid concentration of the aqueous reaction product, and mechanically separating the resulting xanthone crystals from aqueous solution.

PAUL W. BACHMAN.
BERNDT W. HAMMARÉN.

CERTIFICATE OF CORRECTION.

Patent No. 2,307,982.　　　　　　　　　　　　　　　　　January 12, 1943.

PAUL W. BACHMAN, ET AL.

It is hereby certified that error appears in the printed specification of the above numbered patent requiring correction as follows: Page 2, second column, line 18, claim 4, for "160° and 150° C." read --150° and 180° C.--; and that the said Letters Patent should be read with this correction therein that the same may conform to the record of the case in the Patent Office.

Signed and sealed this 16th day of March, A. D. 1943.

(Seal)

Henry Van Arsdale,
Acting Commissioner of Patents.